(12) United States Patent
Dodson et al.

(10) Patent No.: US 6,237,004 B1
(45) Date of Patent: May 22, 2001

(54) SYSTEM AND METHOD FOR DISPLAYING DATA USING GRAPHICAL USER INTERFACE CONTROL ELEMENTS

(75) Inventors: John Paul Dodson, Pflugerville; Minh Nguyen, Austin; Chris Alan Schwendiman, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/028,744

(22) Filed: Feb. 24, 1998

(51) Int. Cl.[7] .................................................. G06F 17/30
(52) U.S. Cl. .................... 707/102; 707/511; 345/333; 345/334; 345/335
(58) Field of Search ................... 707/9, 101, 103, 707/104, 202, 511; 345/331, 340, 347, 356, 743, 333–335; 364/146, 188; 395/500.2, 500.02, 500.44, 701, 707; 706/26; 709/303, 203, 223, 219, 310, 224; 380/4, 29; 704/8

(56) References Cited

U.S. PATENT DOCUMENTS

| | | | |
|---|---|---|---|
| 5,485,618 | * | 1/1996 | Smith ..................................... 345/338 |
| 5,625,565 | * | 4/1997 | Van Dyke ........................ 395/500.02 |
| 5,627,959 | * | 5/1997 | Brown .................................. 345/354 |
| 5,812,394 | * | 9/1998 | Lewis .................................... 364/146 |
| 5,931,917 | * | 8/1999 | Nguyen et al. ....................... 345/333 |
| 6,075,528 | * | 6/2000 | Curtis .................................. 345/333 |

\* cited by examiner

*Primary Examiner*—Thomas G. Black
*Assistant Examiner*—Diane D. Mizrahi
(74) *Attorney, Agent, or Firm*—Leslie A. VanLeeuwen

(57) ABSTRACT

The present invention is a system, method, and computer readable medium for determining which graphic user interface (GUI) control element, including a graphic symbol and associated control code, to use to display particular data. The present invention uses a data-driven model, wherein the GUI control element, referred to as a widget, for a particular set of data is determined dynamically, based on information contained in a database. A widget may be created, displayed, and modified without having to change the program code which uses the widget to display data. As a program executes, it is determined that data needs to be displayed as part of a graphical user interface. The program which is executing calls a generic GUI manager, which determines which widget to use for the particular data at this point in the program and displays the widget. The generic GUI manager reads a database entry associated with the data to be displayed. The database entry contains information, or characteristics, regarding the data. The characteristics are then analyzed by the generic GUI manager to determine which type of widget to use to display the data. An appropriate widget is then selected and used. Both homogenous changes (i.e. graphic symbol changes, where the behavior remains the same) and heterogeneous changes (i.e. where both the graphic symbol and the behavior change) are supported.

27 Claims, 6 Drawing Sheets

SYSTEM AND METHOD FOR DISPLAYING DATA USING GRAPHICAL USER INTERFACE CONTROL ELEMENTS

FIELD OF THE INVENTION

The invention relates to the field of information handling systems. More particularly, the invention relates to a system and method for dynamically creating and modifying graphical user interface control elements used to display data in a graphical user interface.

BACKGROUND OF THE INVENTION

Many information handling systems include a graphical user interface (GUI) with which a user communicates with the system. A GUI includes the use of graphic symbols or pictures, rather than just words, to represent objects or elements in the system. Program code is associated with a graphic symbol in order to allow the graphic symbol to possess certain desired behaviors. A graphic symbol, along with its associated program code, make up a GUI control element. The term "widget" is often used to refer to a graphic symbol and its associated program code. Examples of widgets include scroll bars, buttons, icons, dialog boxes, etc.

Programs which include a GUI typically display many widgets, which can be utilized by a user to communicate with the program and/or control events in the system. For example, a program may require user input regarding two possible choices. To obtain the necessary user input, the program may display a selection box widget on the screen. The user, by using a mouse, points and clicks on one selection within the selection box to indicate a particular choice, or points and clicks on the other selection to indicate a different choice.

The specific widgets used by a program are typically coded in the program itself (or a module or object associated with the program). The type of widget to use for a certain set of data, for instance, is determined in the code. This means that in order to change the type of widget used, the program code must be changed, recompiled, and relinked or rebuilt. In the example above, it may be desired to change the selection box widget to a button widget, where the user indicates a choice by either clicking or not clicking on the button widget. To make this change, the program code must be changed to cause a button widget to display on the screen, rather than a selection box widget. After changing the code, it must be recompiled, and then relinked or rebuilt.

It would be desirable to have a system and method for creating and modifying widgets, where the widget specification is determined outside of a program code implementation. It would also be desirable to decouple the widget choice from a particular code implementation, so that a widget may be changed without having to change the program code which uses the widget to display (i.e. contain) data.

SUMMARY OF THE INVENTION

Accordingly, the present invention is directed to a system, method, and computer readable medium for determining which graphic user interface (GUI) control element, including a graphic symbol and associated control code, to use to display particular data. The present invention uses a data-driven model, wherein the GUI control element, referred to as a widget, for a particular set of data is determined dynamically, based on information contained in a database. Thus, the widget specification is determined outside of the actual program code which uses the widget, so as to decouple the widget choice from the particular code implementation. The present invention allows a widget to be created, displayed, and modified without having to change the program code which uses the widget to display data.

As a program executes, it is determined that data needs to be displayed as part of a graphical user interface. The program which is executing calls a generic GUI manager, which determines which widget to use for the particular data at this point in the program and displays the widget. The generic GUI manager reads a database entry associated with the data to be displayed. The database entry contains information, or characteristics, regarding the data. The characteristics are then analyzed by the generic GUI manager to determine which type of widget to use to display the data. An appropriate widget is then selected and used.

An advantage of the present invention is that a widget specification is determined outside of a program code implementation. Thus the widget used to display a particular set of data may be changed without changing the code in the program which actually uses and displays the data. If one or more characteristics are changed in the database entry corresponding to a particular data set, the widget used to display the data will dynamically change without any changes being made to the program code. Another advantage of the present invention is that it supports both homogenous changes (i.e. graphic symbol changes, where the behavior remains the same) and heterogeneous changes (i.e. where both the graphic symbol and the behavior change).

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
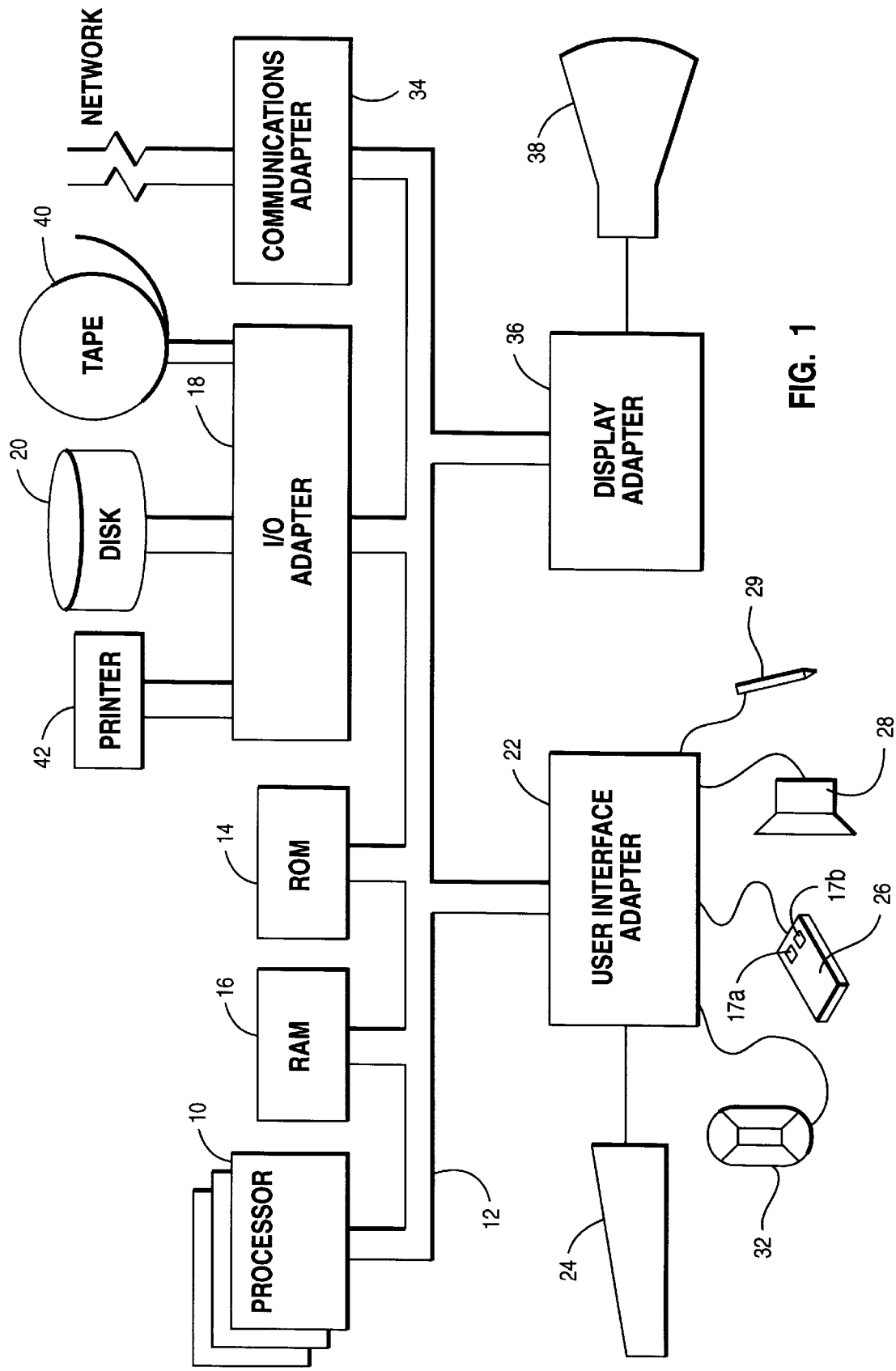
FIG. 1 is a block diagram of an information handling system on which the present invention may be implemented.

The invention may be implemented on a variety of hardware platforms, including personal computers, workstations, mini-computers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

The present invention is a system, method, and computer readable medium for determining which graphic user interface (GUI) control element, including a graphic symbol and associated control code, to use to display particular data. The present invention uses a data-driven model, wherein the GUI control element, referred to as a widget, for a particular set of data is determined dynamically, based on information contained in a database. Thus, the widget specification is determined outside of the actual program code which uses the widget, so as to decouple the widget choice from the particular code implementation. The present invention allows a widget to be created, displayed, and modified without having to change the program code which uses the widget to display data.

Figure 2:
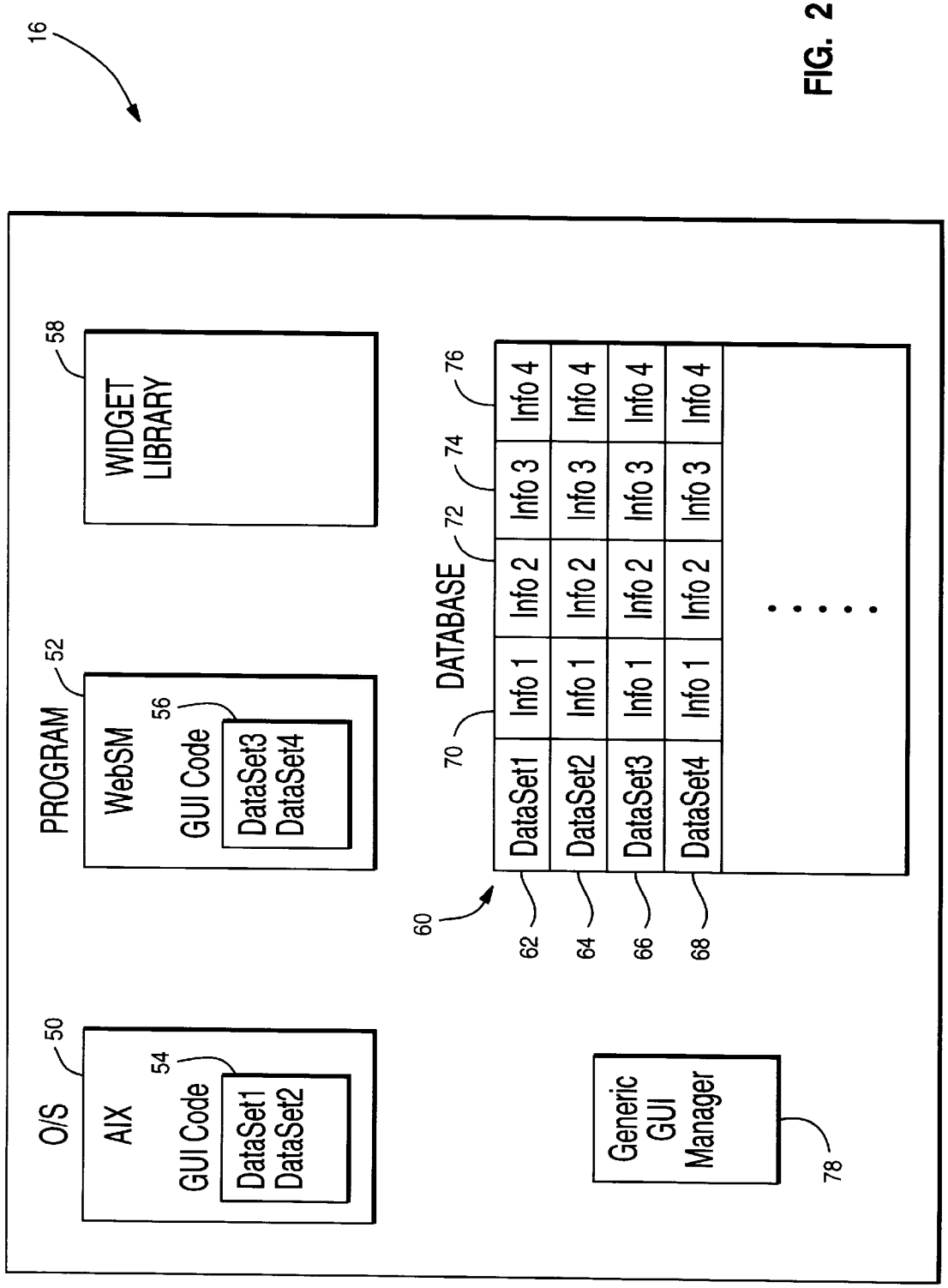
FIG. 2 is a block diagram illustrating several components of the present invention.

FIG. 2 is a block diagram which illustrates several components of the present invention residing in RAM 16. Note that only those components necessary to describe the present invention are depicted in FIG. 2. Referring now to FIG. 2, operating system 50 and program 52 are executing in RAM 16. In the described embodiment, operating system 50 is AIX (Advanced Interactive Executive) and program 52 is WebSM. Many programs may be executing in RAM 16, however for illustrative purposes, only operating system 50 and program 52 are shown. Also, note that program 52 may be any type of program (system, application, etc.) and may have been written in any one of a variety of programming languages before being compiled or assembled, linked, and loaded into RAM 16. Alternately, program 52 may be a program, such as a Java program, which executes in a virtual machine layer (not shown) residing in RAM 16.

In the example shown in FIG. 2, operating system 50 and program 52 both contain portions of code which control a graphical user interface. GUI code 54 and 56 may be implemented as functions, modules, subroutines, objects, etc. Each GUI code section references several sets of data, which are to be displayed as widgets. For example, GUI code 54 is shown referencing DataSet1 and DataSet2, while GUI code 56 is shown referencing DataSet3 and DataSet4. Most GUI code sections will actually reference many sets of data, however, for illustrative purposes each GUI code section 54 and 56 references two sets of data in the example shown.

Often, a widget library 58 is provided, either by the operating system or by a separate windowing system. The widget library includes widgets drawn in a certain style and which behave in a certain manner. In the prior art, the particular widgets used by GUI code sections 54 and 56 would be hard coded in the GUI code. The desired graphic symbol and behavior of a widget would be specified in the GUI code, by referencing one of the widgets in widget library 58. For example, DataSet1 may be hard coded in GUI code 54 to be displayed as a button widget, possessing certain behaviors. In the prior art, a particular button widget from widget library 58 would be specified, or hard coded, directly in GUI code 54. If it became desirable at some point in time to modify DataSet1 so that it would be represented by a different widget, GUI code 54 would have to be changed. For example, if it was desired to change the display of DataSet1 from a button widget to a selection box widget, GUI code 54 would have to be modified to specify the display of DataSet1 as a particular selection box widget from widget library 58. GUI code 54 would then have to be re-compiled or re-assembled, relinked, and reloaded.

The present invention is a data-driven model, where the graphic symbol and control code (i.e. widget) associated with a particular set of data is determined dynamically, based on information stored in database 60. Database 60 may be implemented as a table (as shown), or may be any type of database, including, but not limited to a hierarchical, network, relational, or object-oriented database. Each entry 62–68 in database 60 contains information, referred to as Info1 70, Info2 72, Info3 74, and Info4 76, regarding a particular set of data. As new widgets are required (e. g. , when a new program is loaded containing data which must be displayed via widgets), additional information regarding the new sets of data may be added to the database. Database 60 may also be implemented as more than one database. Operating system 50 may have its own database, while program 52 and other application programs share a different database.

As a program executes, different portions of GUI code, such as GUI code 54 and 56 will execute. As GUI code 54 and 56 reference and use various sets of data, the display and control of the data is determined according to the information stored in database 60. For example, suppose that GUI code 56 is executing, and has reached a point in the code where DataSet3 needs to be displayed on a display device. The determination as to which graphic symbol and control code (i.e. widget) to use for DataSet3 is obtained based on the information (Info1 70, Info2 72, Info3 74, and Info4 76) from entry 66 in database 60.

Many different types of information may be stored in database 60. For example, information may be stored which selects a particular widget from widget library 58. Alternately, the information may consist of various characteristics of the data set, and these characteristics may be used to dynamically determine which widget can best be used to display the particular data. In the described embodiment, the information stored for each entry includes characteristics regarding the particular set of data, which are used by generic GUI manager 78 to determine which type of widget should be used for a particular circumstance or particular set of data.

Figure 3:
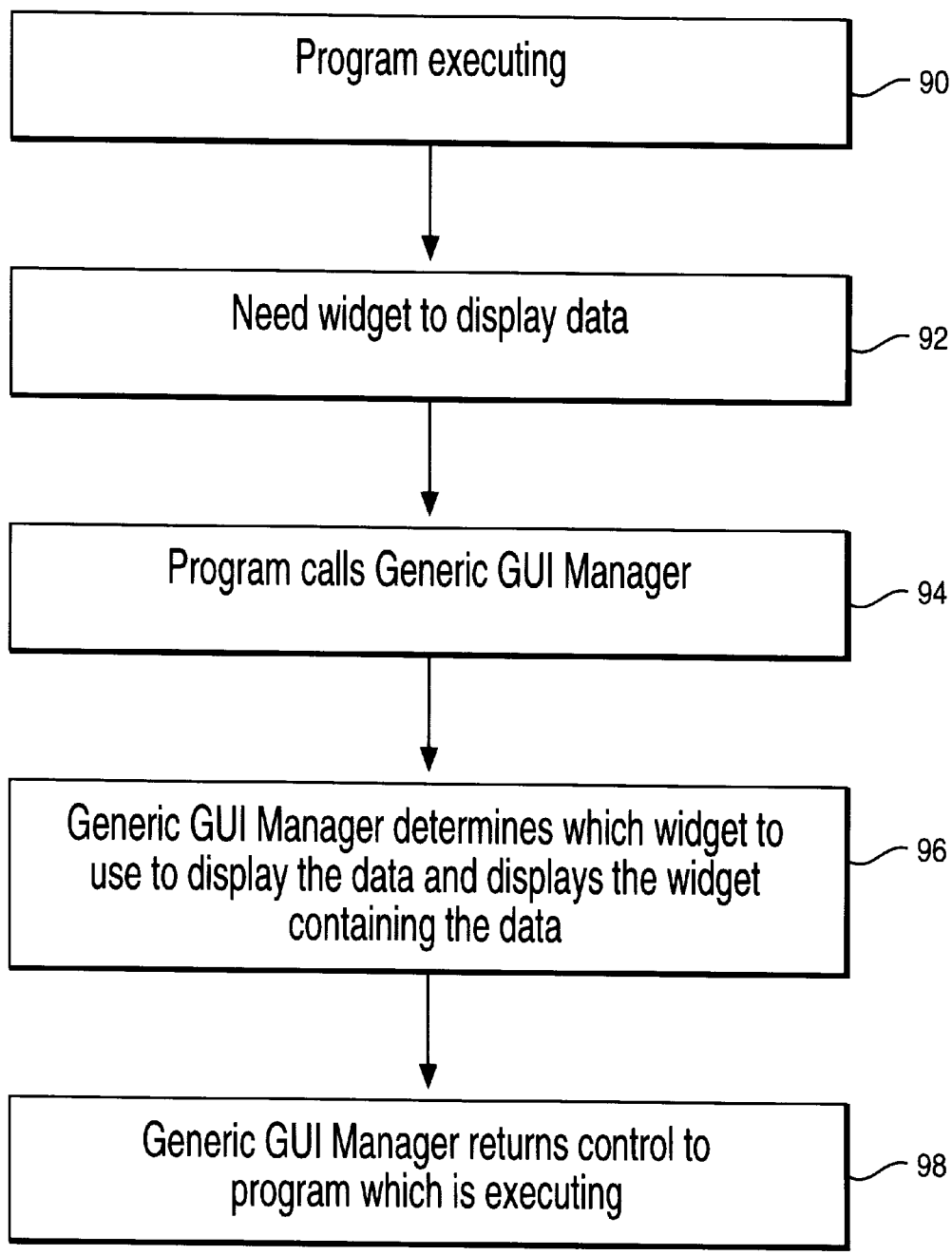
FIGS. 3 and 4 are flow charts illustrating a method for selecting and displaying a widget according to the teachings of the present invention.
Figure 4:
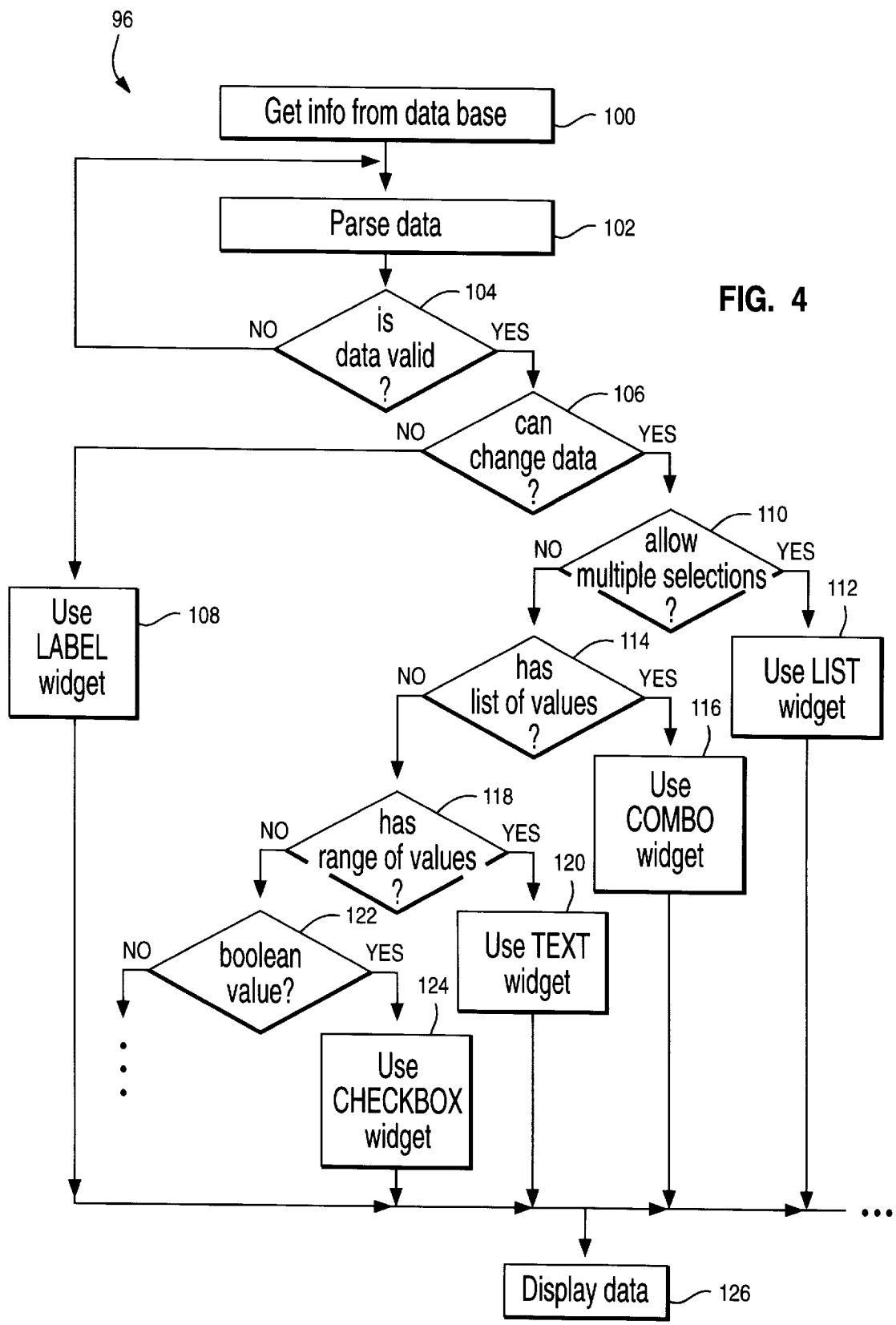

FIGS. 3 and 4 are flow charts which depict a method for selecting a widget to use for a particular set of data. Referring now to FIG. 3, a program is executing (step 90). At a particular point in the program, there is a need for a widget to be displayed as part of a GUI (step 92). The program which is executing calls the generic GUI manager (step 94), which determines which widget to use for the particular data at this point in the program and displays the widget (step 96). Further details regarding step 96 are described below, with reference to FIG. 4. The generic GUI manager then returns control to the program which called it (step 98).

Referring now to FIG. 4, further details regarding the selection of a widget by the generic GUI manager will now be described. The first step is to obtain the information associated with the requested set of data from the database (step 100). The data is parsed (step 102) and checked to ensure that there are no errors (step 104). The characteristics are then analyzed to determine which type of widget to use to display the data. A check is made to determine if the data can ever be changed by a user (step 106). If not, then a label widget is selected (step 108). If the data can be changed by a user, a check is made to determine if multiple selections are allowed (step 110). If so, a list widget is selected (step 112). If not, a check is made to determine if the data contains a list of values (step 114). If so, a combination widget is selected (step 116). If not, a check is made to determine if the data has a range of values (step 118). If so, a text widget is selected (step 120). If not, a check is made to determine if the data is a boolean (i.e. two choices) data type (step 122). If so, a check box widget is selected (step 124). Any number of determinations may be made, depending on the number of possible widgets from which to choose. Finally, when a widget is selected, it is displayed on the display device (step 126).

In addition to determining which widget type (i.e. graphic symbol and behaviors) to use for particular data, the database entry for a particular set of data may contain additional information. For example, the database entry may contain default data values and currently selected data values. Those skilled in the art will appreciate that many different types of information and/or characteristics may be stored in each database entry.

By using the present invention, the widget used to display a particular set of data may be changed without changing the GUI code. If one or more characteristics are changed in the database entry corresponding to a particular data set, the widget used to display the data will dynamically change without any changes being made to the GUI code. This is especially useful when the set of data represented by the widget is changed. For example, a particular set of data may initially have two possible values from which a user may select one value or the other. In this case, a check box widget may be selected by the generic GUI manager to represent the data. At some point in the future, the number of choices may be increased. Rather than changing the program code, the database entry for the set of data is changed to reflect the increased number of choices. The next time the data is displayed, a different type of widget, such as a list widget, may be used, rather than the check box widget.

The present invention supports both homogeneous and heterogeneous changes. In a homogeneous change, the same type of widget is used to represent particular data. For example, an icon widget may be changed to a different icon widget. In a homogeneous change, the graphic symbol changes, but the underlying behavior is the same (or very similar). In a heterogenous change, a different type of widget is used altogether. Thus, data that was previously represented by a button widget may be represented by a text widget. In a heterogenous change, both the graphic symbol and the associated behavior of the widget are changed.

Figure 5:
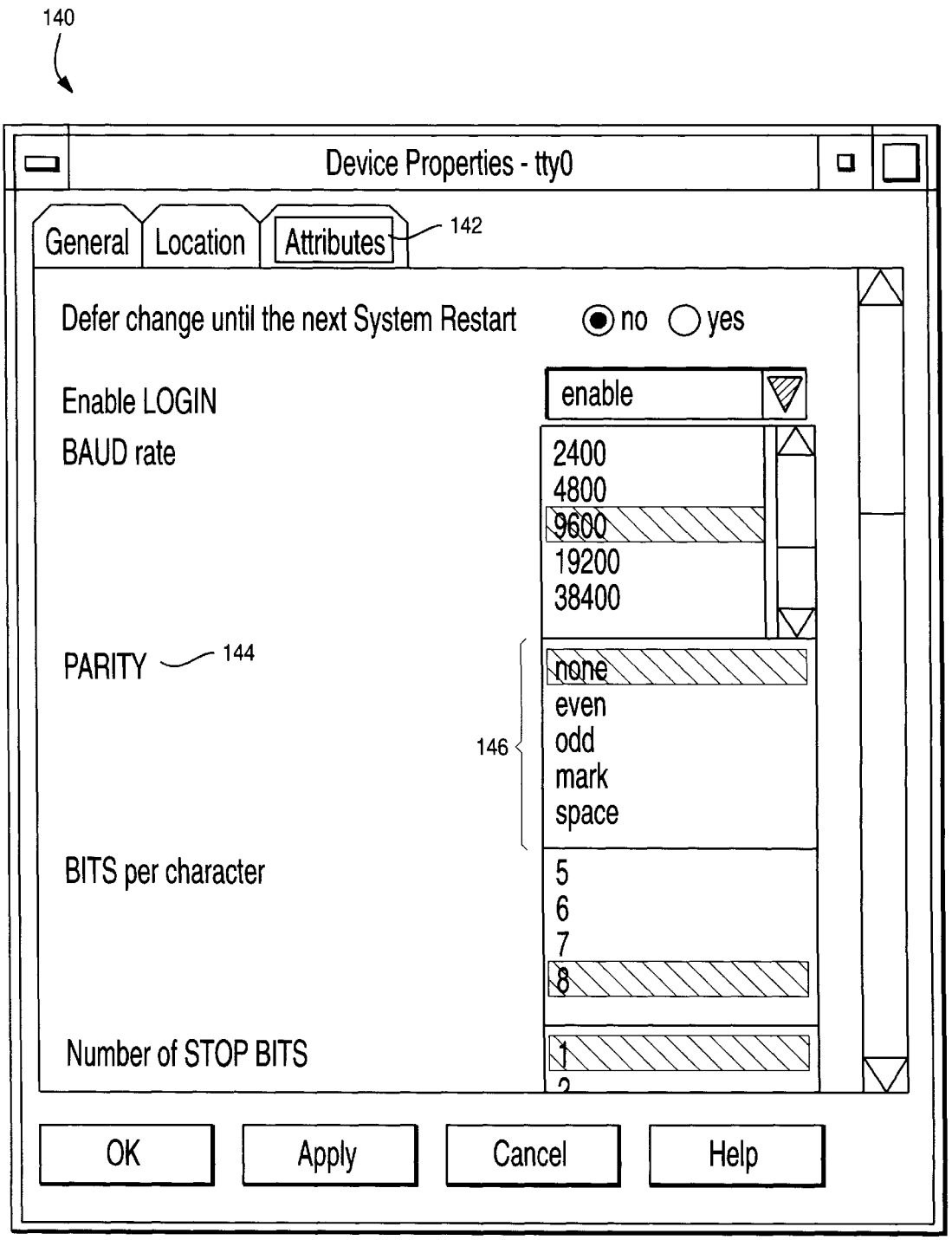
FIG. 5 depicts a widget displayed on a screen.
Figure 6:
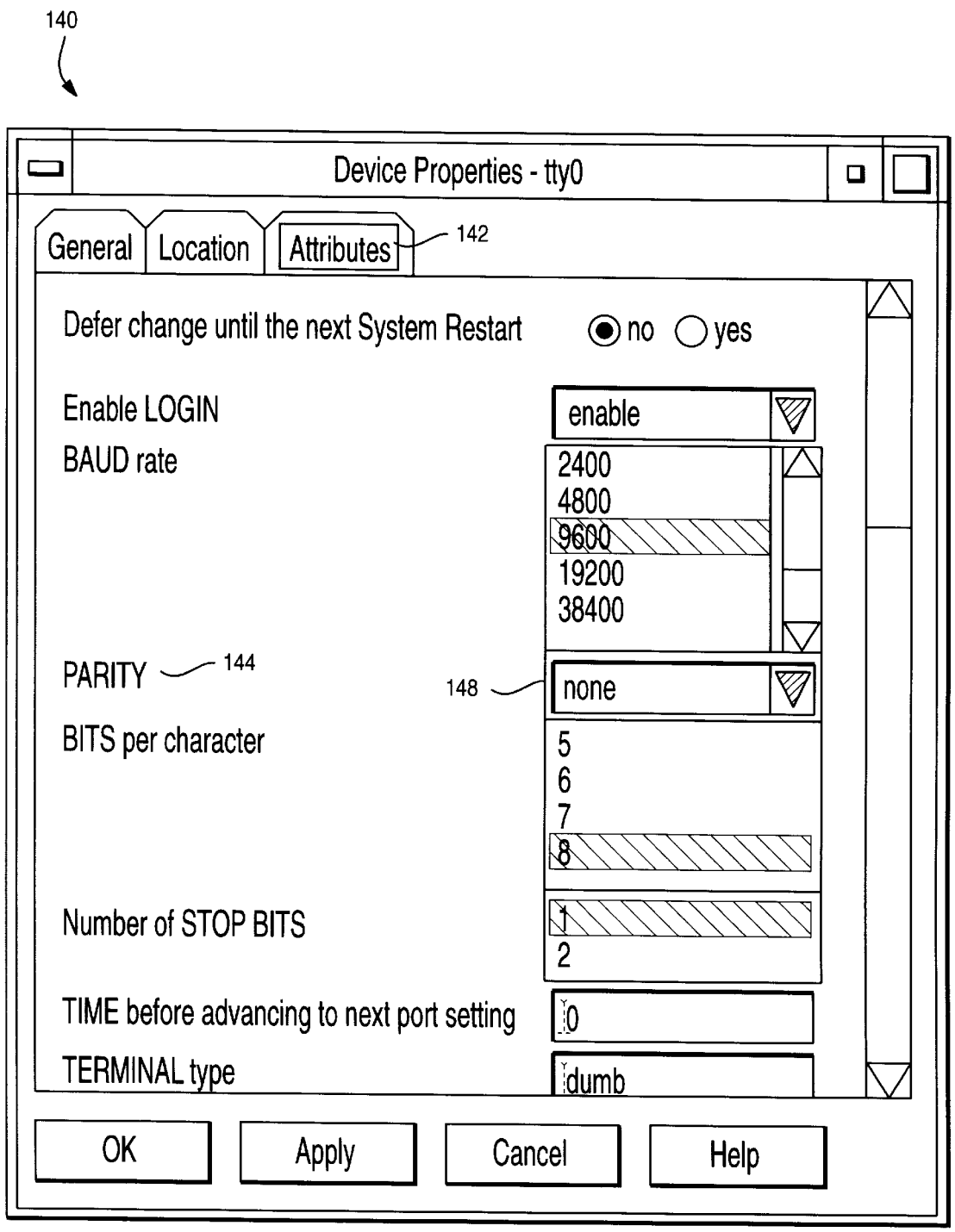
FIG. 6 depicts the widget of FIG. 5 as displayed after the database entry for the widget has been modified.

FIGS. 5 and 6 depict an example GUI 140, and illustrate how a particular widget may be displayed according to the present invention. Referring now to FIG. 5, several attributes 142 associated with a particular TTY device are shown. Representative database code, which may be used to define parity attribute 144, is as follows:
PdAt:
uniquetype="tty/rs232/tty"
attribute="parity"
deflt="none"
values="none, even, odd, mark, space"
width=" "
type="R"
generic="DU"
rep="slm"
nls_index=13
PdAtXtd:
uniquetype="tty/rs232/tty"
attribute="parity"
classification="B"
sequence="030"
operation=" "
operation_value=" "
description=" "
list_cmd=" "
list_values_cmd=" "
change_cmd=" "
help="0420212"
nls_values=" "

The code shown is written for an object oriented database, where PdAt and PdAtXtd represent objects stored in the object oriented database. Note that the "generic" field in the above database entry includes the letter "U. " In the current embodiment, this indicates that the parity attribute may be changed by a user. Also, note that the "rep" field contains the letters "slm." The letter "l" indicates that parity should be displayed as a list, and the letter "m" indicates that a user may choose multiple values. The generic GUI display program reads the database entry (at step 100 in FIG. 4). This database entry is then used to determine the appropriate widget to use in order to contain parity data (steps 106 through 126 in FIG. 4). Referring now to FIG. 5, note that parity 144 is displayed as list widget 146 which allows the user to choose multiple values.

In accordance with the present invention, the database entry for parity attribute 144 may be changed. Changing the database entry will cause the widget representation of parity attribute 144 to automatically change. For example, suppose that the database entry is changed as follows:
PdAt:
uniquetype="tty/rs232/tty"
attribute="parity"
deflt="none"
values="none, even, odd, mark, space"
width =" "
type="R"
generic="DU"
rep="sl"
nls_index=13

As shown in FIG. 6, parity attribute 144 is now displayed as combination box (i.e. combo box) 148, where multiple values are displayed, but only one value may be selected by the user. The change from a list widget (146 in FIG. 5) to a combo box widget (148 in FIG. 6) was caused by removing the letter "m" from the "rep" field.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for displaying data as a program is executing, comprising the steps of:
    obtaining one or more characteristics associated with the data, wherein the characteristics are stored in a database that is separate from the program that is executing;
    dynamically selecting a graphical user interface control element to display the data, based on the characteristics associated with the data; and
    displaying the data using the selected graphical user interface control element.

2. A method according to claim 1, wherein said obtaining step comprises the step of reading a database entry associated with the data.

3. A method according to claim 2, wherein the database entry associated with the data may be changed without changing the program.

4. A method according to claim 1, wherein said selecting step further comprises the step of determining, based on the characteristics associated with the data, a graphic symbol to represent the data.

5. A method according to claim 4, wherein the graphic symbol is associated with one or more behaviors.

6. A method according to claim 1, wherein said selecting step further comprises the step of choosing one of a plurality of graphical user interface control elements stored in a library.

7. An information handling system, comprising:
    a display means;
    a program, executing in the information handling system;
    data used by said program, wherein said data is to be displayed on said display means;
    a database containing characteristics associated with said data;
    means for obtaining one or more selected characteristics associated with said data from said database;
    means for dynamically selecting a graphical user interface control element to display said data on said display means, based on the selected characteristics associated with said data; and
    means for displaying said data on said display means, wherein said data is displayed by using the selected graphical user interface control element.

8. An information handling system according to claim 7, wherein said means for obtaining comprises means for reading a database entry in said database, wherein the database entry is associated with said data.

9. An information handling system according to claim 8, wherein the database entry associated with said data may be changed without changing said program.

10. An information handling system according to claim 7, wherein said means for selecting further comprises means for determining, based on the characteristics associated with said data, a graphic symbol to represent said data.

11. An information handling system according to claim 10, wherein the graphic symbol is associated with one or more behaviors.

12. An information handling system according to claim 7, wherein said means for selecting further comprises means for choosing one of a plurality of graphical user interface control elements stored in a library.

13. A computer readable medium for controlling displaying of data on a display means as a program is executing, comprising:
    means for obtaining one or more characteristics associated with the data, wherein the characteristics are stored in a database that is separate from the program that is executing;
    means for dynamically selecting a graphical user interface control element to display the data on the display means, based on the characteristics associated with the data; and
    means for displaying the data on the display means by using the selected graphical user interface control element to display the data.

14. A computer readable medium according to claim 13, wherein said means for obtaining comprises means for reading a database entry associated with the data.

15. A computer readable medium according to claim 14, wherein the database entry associated with the data may be changed without changing the program.

16. A computer readable medium according to claim 13, wherein said means for selecting further comprises means for determining, based on the characteristics associated with the data, a graphic symbol to represent the data.

17. A computer readable medium according to claim 16, wherein the graphic symbol is associated with one or more behaviors.

18. A computer readable medium according to claim 13, wherein said means for selecting further comprises means for choosing one of a plurality of graphical user interface control elements stored in a library.

19. A method for dynamically selecting a graphical user interface control element to display data from a first program as the first program is executing, comprising the steps of:
    passing control from the first program to a second program;
    obtaining, by the second program, one or more characteristics associated with the data, wherein the characteristics are stored in a database that is independent from the first program;
    selecting, by the second program, a particular graphical user interface control element from a plurality of graphical user interface control elements stored in a library, wherein the particular graphical user interface control element is selected based on the characteristics associated with the data;
    displaying the data, by the second program, wherein said displaying uses the particular graphical user interface control element to display the data; and
    returning control from the second program to the first program.

20. A method according to claim 19, wherein said obtaining step further comprises the step of reading a database entry containing the characteristics.

21. A method according to claim 19, wherein each graphical user interface control element stored in the library includes a graphic symbol and one or more behaviors.

22. An information handling system, comprising:

a display means;

a first program, executing in the information handling system;

data used by said first program, wherein said data is to be displayed on said display means;

a database containing characteristics associated with said data;

a library containing a plurality of graphical user interface control elements;

a second program, for displaying said data used by said first program;

means for obtaining, by said second program, one or more characteristics associated with said data, wherein the characteristics are obtained from said database;

means for selecting, by said second program, a particular graphical user interface control element from said library, wherein the particular graphical user interface control element is selected based on the characteristics associated with said data; and means for displaying said data, by said second program, on said display means, wherein said data is displayed using the particular graphical user interface control element.

23. An information handling system according to claim 22, wherein said means for obtaining further comprises means for reading a database entry containing the characteristics.

24. An information handling system according to claim 22, wherein each graphical user interface control element stored in the library includes a graphic symbol and one or more behaviors.

25. A computer readable medium for controlling displaying of data on a display means as a first program is executing, comprising:

means for passing control from the first program to a second program;

means for obtaining, by the second program, one or more characteristics associated with the data, wherein the characteristics are stored in a database that is independent from the first program;

means for selecting, by the second program, a particular graphical user interface control element from a plurality of graphical user interface control elements stored in a library, wherein the particular graphical user interface control element is selected based on the characteristics associated with the data;

means for displaying the data, by the second program, wherein said displaying uses the particular graphical user interface control element to display the data; and means for returning control from the second program to the first program.

26. A computer readable medium according to claim 25, wherein said means for obtaining further comprises means for reading a database entry containing the characteristics.

27. A computer readable medium according to claim 25, wherein each graphical user interface control element stored in the library includes a graphic symbol and one or more behaviors.

* * * * *